Patented Jan. 29, 1935

1,989,187

UNITED STATES PATENT OFFICE 1,989,187

VAPOR-ELECTRIC CONTROL SYSTEM

Alan S. Fitz Gerald, Wynnewood, Pa.

Application December 16, 1933, Serial No. 702,677
In Great Britain December 17, 1932

11 Claims. (Cl. 171—97)

This invention relates to the control of vapor-electric devices, more particularly of the type in which the space current is controlled by varying the phase relation between the anode voltage and the grid voltage.

Means are well known in the art for providing an alternating voltage, for grid control purposes, which can be varied in phase manually. For example, electro-magnetic phase-shift devices having fixed primary windings and rotatable secondary windings are well known. Another well known method of shifting the phase of the grid voltage consists of employing phase-shifting networks embodying variable elements such as adjustable condensers, reactors, or resistances.

All of the above phase-shifting methods, however, usually involve a variable element intended either for manual manipulation or which must be mechanically adjusted by other means involving a mechanical motion or displacement. For example, an electro-magnetic phase-shifter or variable condenser must be turned either by hand or by means of a motor and gear; a variable reactor or resistance usually embodies some form of sliding contact which must be moved by motor or manual means.

While these methods are entirely satisfactory and desirable when it is desired to control vapor-electric devices directly, from a manual control device, there are many instances in electric control systems in which it is desired to control the energization of a load, through vapor-electric devices, in response to some electrical or other condition existing in an electrical system or in some industrial or chemical process.

Electron-discharge devices of the high-vacuum type, as is well known, can be controlled in accordance with the magnitude of the voltage applied to the grid. Means can readily be provided for furnishing a voltage variable in magnitude in accordance with almost any kind of electrical, or other, effect, and electron-discharge devices of the high-vacuum type are widely used in electric control systems for furnishing a controlling action in response to a voltage derived from an electrical condition.

When, however, it is required to control relatively large amounts of power, vapor-electric devices, rather than devices of the high-vacuum type, must be used.

In order to control vapor-electric devices of the type to which this invention pertains, a variable-phase grid voltage, or its equivalent, is necessary. Only in a very few instances, however, is it found that the aforesaid effect, to which it is desired the control of the vapor-electric devices should be responsive, manifests itself in the form of a phase-shift. It is therefore necessary to provide apparatus for creating a variable phase voltage in response to the said electrical or other effect. If, for example, a voltage, variable in magnitude, can be derived from this effect, means must be provided for converting a voltage variable in magnitude into a voltage variable in phase.

Means for accomplishing this result through the use of movable devices operated through gearing or the like, having a motor energized in accordance with the varying voltage, are well known in the art. It is preferable, however, to employ apparatus of the simplest and most economical type, wherever possible, and in accordance with my present invention I provide an extremely simple electric circuit comprising neither motor-operated apparatus, nor electron-discharge devices, which sets up an alternating voltage, variable in phase, in accordance with the magnitude of a controlling voltage.

It is therefore an object of my invention to provide a novel means of obtaining variable phase grid excitation, for vapor-electric devices, in accordance with the magnitude of a controlling voltage, which may be derived from any electrical condition in an electric system or industrial process.

It is a further object of my invention to provide apparatus for accomplishing the above purpose of an especially cheap, simple and reliable type.

These and other novel features, which I believe to be characteristic of my invention, will be set forth with particularity in the appended claims. My invention itself, however, both as to its organization and method of operation, together with further objects and advantages thereof, may best be understood with reference to the following description taken in connection with the accompanying drawings, in which:

Figure 1:
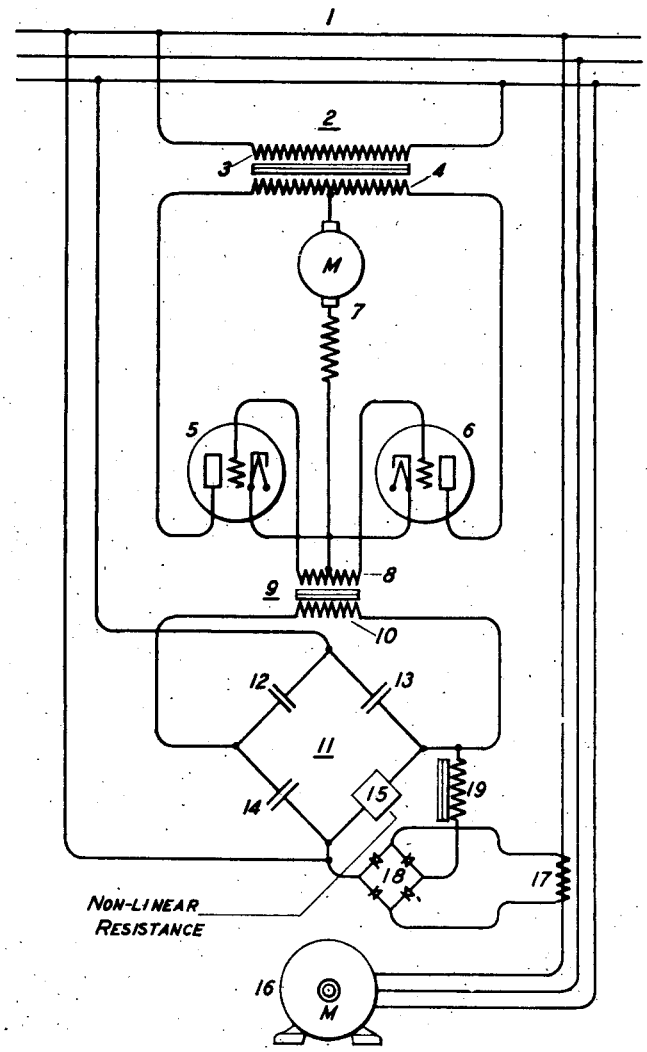
Figure 1 shows an electric circuit diagram of embodiment of my invention.

I show in Figure 1, by way of example, a method of controlling the energization of one load device in accordance with the load current drawn by another load circuit.

In many industrial processes it is required to control one motor in accordance with the load to which another motor is subjected. For example, in pulp grinders it is desirable automatically to control the log feed motor in accordance with the power drawn by the grinder motor. Again, in electric furnaces it is desirable to control the electrode feed motor in accordance with the furnace arc current. Many other similar requirements will readily be recalled by those skilled in the art.

In the figure I show a source of alternating current power 1 which may be a three-phase supply circuit. Across two of the phases of the source 1 I connect a transformer 2 having a primary winding 3 and a secondary winding 4. The secondary winding 4 is provided with a mid-point tap.

Two vapor-electric devices 5 and 6, of the type controllable by means of grid voltage phase-shift, are energized from the secondary winding 4 of the transformer 2. Between the cathodes of the vapor-electric devices 5 and 6 and the mid-point of the secondary winding 4 I connect a load device 7, which may, for example, be the log feed motor in a pulp grinder.

In accordance with the above arrangement it will be obvious to those skilled in the art, that the motor 7 may be furnished with rectified current which may be controlled in magnitude by applying to the grids of the vapor-electric devices 5 and 6 a variable phase grid voltage.

I therefore energize the grids of the vapor-electric devices 5 and 6 from the secondary winding 8 of a transformer 9 having a primary winding 10 excited from the source 1 through a phase-shift network 11.

The phase-shift network 11 comprises three capacitors 12, 13 and 14, together with a fourth element 15, which may be any suitable device in which the resistance is variable under different electrical conditions.

For example, the non-linear resistance 15 may be a thermal element such as a metal filament enclosed in an inert gas or it may be made of a silicious or ceramic material such as that known as "Thyrite" and described in the Journal of the American Institute of Electrical Engineers for May 1930, on page 351.

Either of these devices is characterized by the fact that the resistance thereof varies in accordance with the extent to which it is energized. A metal filament increases its resistance when the current which it carries is increased, or if it be raised in temperature in another manner. Material such as "Thyrite" decreases its resistance with increase of current.

The action of the non-linear device 15 in accordance with my invention is as follows: in a network comprising three capacitors and a variable resistance, as shown in the figure, it is well known to those skilled in the art that, when the resistance is increased, the phase of the grid voltage is advanced and the anode current of the vapor-electric device is increased. When the resistance is decreased the grid voltage is retarded in phase and the anode current is reduced.

It will be obvious on reference to the figure that there is no direct-current conductivity between the device 15 and the grid excitation circuit. The network is energized across one diagonal from the source 1 and the grid transformer 9 is connected across the opposite diagonal. The element 15 is in electrical relation with the source 1 and the grid transformer 9 only in respect of alternating current energy. So far as any direct current effects are concerned, the device 15 may be regarded as being insulated or disconnected from both the source and the grid excitation circuit.

According to my invention therefore, I cause the device 15 to be variably energized with direct current. The resistance of the device 15 is therefore caused to vary in accordance with the magnitude of this direct current energization. It will be obvious, however, that any direct current energy applied to the device 15 will be restricted entirely thereto and cannot energize the grid excitation circuit in any way. However, if the resistance of the device 15 changes, due to this direct current control energization, there will be a corresponding change in the phase of the grid voltage. Thus the anode current of the vapor-electric devices 5 and 6 may be caused to vary in accordance with the direct current energization of the device 15. For example, if the device 15 consists of a metal filament of which the temperature may be varied by the direct current excitation, the resistance will increase when the direct current energization is increased and the anode current of the vapor electric devices 5 and 6 will be increased. If, on the other hand, the non-linear resistance 15 consists of a material having a negative current-resistance characteristic such as, for example, "Thyrite", the control will be inverse; when the direct current voltage applied to 15 is increased the resistance will decrease and the anode current of the vapor-electric devices 5 and 6 will be reduced.

Thus the current supplied to the motor 7 may be controlled, by means of grid voltage phase-shift, by any electrical condition or other process from which a variable direct current voltage may be derived. Obviously, if the electrical condition to which it is desired the control effect should be responsive, furnishes a variable alternating voltage, this may be rectified and the rectified voltage applied to the non-linear resistance 15.

I show in Figure 1 a three phase motor 16 which may represent the motor driving the grinder. A current transformer 17 energizes a rectifier 18 in accordance with the grinder motor load current. Rectified current from 18 is connected to energize the non-linear element 15 through a reactor 19.

For this application inverse action is required, that is to say, the log feed motor should be slowed down if the load on the grinder motor becomes excessive. The device 15 in this case should therefore have a negative current characteristic. If, for example, the non-linear resistance 15 comprises an element of a material having characteristics similar to "Thyrite" the circuit will function in the following manner: when the load on the grinder motor 16 is increased the direct current voltage applied by the rectifier 18 to the element 15 through the reactor 19 will likewise increase. The resistance of 15 will decrease, the grid voltage of the vapor-electrical devices 5 and 6 will be retarded and the current supplied to the log feed motor will be reduced thereby decreasing the mechanical load on the grinder motor 16.

It is well known to those skilled in the art that only a very small amount of energy indeed is necessary to control the grids of suitably designed vapor-electric devices. Thus the alternating current energization of the phase-shift network 11 is only required to be of a low level of intensity insufficient appreciably to affect the resistance of the non-linear device 15. In any case it will be obvious that the alternating current energization of 15 from the source 1 is of substantially constant magnitude.

The function of the reactor 19 is to prevent any control or other circuit, from which the direct current control voltage is derived, from forming an effective portion of the alternating current phase-shift network. It will be appreciated by those skilled in the art that it may be possible to omit the reactor 19 in cases where the direct current control voltage is derived from a rectifier, if the latter, due to its uni-laterally conducting characteristics, effectively precludes the source of the control voltage forming an effective portion of the alternating current phase-shift circuit. However, in any application in which the control voltage is derived from a bi-laterally conducting direct current source the reactor 19 should be included.

I wish it to be clearly understood that, if the non-linear device 15 be a thermal element, my invention contemplates the control of the phase relation of the grid voltage by variation of the resistance of the device 15 through a temperature change brought about by energy derived from the variable source. It is, therefore, entirely immaterial, so far as the scope of my invention is concerned, whether the resistance, which is included in the phase shift network, is heated directly by the conduction therein of the control energy, or indirectly by thermal conduction from an adjacent heater coil energized from the variable control source.

It will readily be apparent to those skilled in the art that by means of two duplicate equipments of vapor-electric devices and phase-shift networks, having each a non-linear control element precisely as illustrated in the drawings, and both controlled from a common variable control source, inverse control action on two load circuits may be furnished if one of the elements 15 has a positive characteristic and the other a negative.

For example, if the two loads 7 consist of illuminating circuits of two different colors and if one of the elements 15 be a metal element which increases its resistance when the control energy is increased, and the other element 15 is made of "Thyrite", or the like which decreases its rsistance when the control is increased, the two colored illuminating loads can, respectively, be faded in and faded out according to the effect frequently desired in decorative illuminating arrangements.

Figure 2:
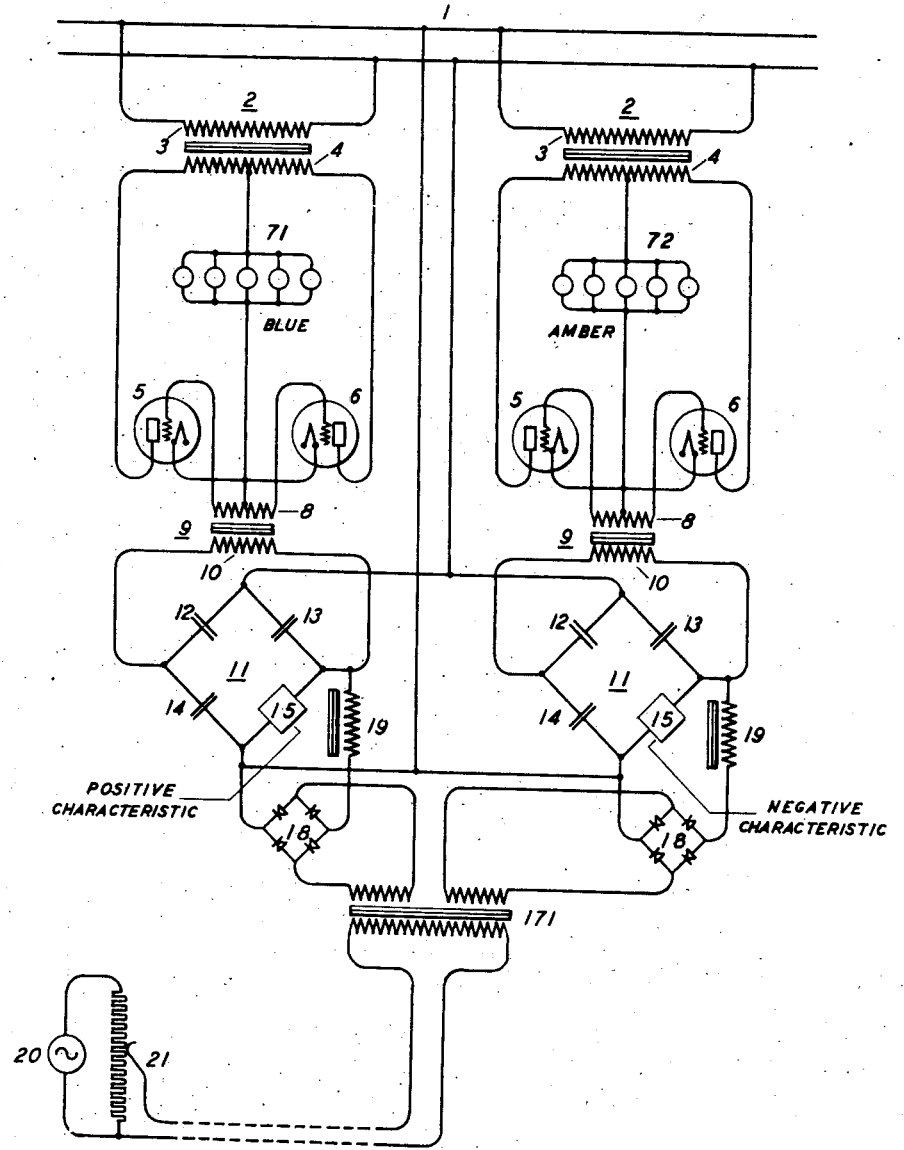
Figure 2 shows an electric circuit diagram of modification of my invention for controlling two load circuits, simultaneously, in opposite sense.

Such an arrangement is illustrated in Figure 2 in which I show two control circuits substantially similar to the arrangement shown in Figure 1, each of the various devices in the two circuits shown in Figure 2 being designated by similar numerals, except as follows. In Figure 2 each of the load devices, instead of a motor 7, consists of an illuminating circuit. The two illuminating circuits in Figure 2 may be of different colors such as, for example, blue and amber, and are designated respectively by the numerals 71 and 72.

As indicated by the legend on the drawing the two non-linear resistances have dis-similar characteristics, one having a positive characteristic, and the other having a negative characteristic. That is to say, the element 15 shown on the left of the figure increases its resistance when the direct current energization is increased and the non-linear resistance 15 shown on the right of the figure decreases its resistance when the direct current is increased.

Each of the non-linear resistances 15 is energized as in Figure 1, from a rectifier 18, through a reactor 19, if necessary. In place of the current transformer 17 shown in Figure 1, I show in Figure 2 a transformer 171 having two separate secondary windings from which the rectifiers 13 are energized. The transformer 171 is energized with alternating current from a source 20, through a potentiometer 21, by means of which the alternating current energization of 171 may be varied at will. The connections between the source 20, the potentiometer 21, and the transformer 171 are shown in Figure 2 in broken lines to indicate that the controlling means may, if desired, be situated at a distance from the load circuit and vapor-electric devices.

It will be apparent to those skilled in the art that by means of my invention, as shown in Figure 2, inverse action of the blue and amber lights 71 and 72, simultaneously, may be obtained with only two conductors between the control station and the apparatus, instead of at least three conductors, which would be necessary if the circuits were separately controlled.

Although I have chosen a particular embodiment of my invention for the purpose of explanation, many modifications thereof will be apparent to those skilled in the art to which it pertains. My invention, therefore, is not to be limited except in so far as is necessitated by the prior art and the spirit of the appended claims.

What I claim as new and desire to secure by Letters Patent of the United States is:

1. A remote control system for controlling a plurality of load circuits in opposite sense from a single controlling circuit element through two conductors, comprising, a source of alternating current power, a first electric valve, a first load circuit energized from said source through said first electric valve, a second electric valve, a second load circuit energized from said source through said second electric valve, a first phase-shift network for controlling the power supplied to said first load circuit, a second phase-shift network for controlling the power supplied to said second load circuit, each of said phase-shift networks including a plurality of capacitors and a resistance element having a non-linear current-resistance characteristic, said non-linear resistance elements having dissimilar current-resistance characteristics, a plurality of rectifiers, each of said non-linear resistance elements being energized with direct current from one of said rectifiers, an alternating current supply circuit, said rectifier being energized from said circuit, and means for varying the alternating current energization of said rectifiers whereby the energization of said load circuits is simultaneously varied in opposite sense.

2. In combination, an alternating current supply circuit, a circuit subject to electrical variations, and means for producing a potential variable in phase with respect to that of said supply circuit in accordance with said electrical variations, comprising means for deriving from said second mentioned circuit a uni-directional voltage variable in accordance with said electrical variations, and a phase-shift network including a plurality of capacitors and a resistance having a non-linear current-resistance characteristic, means for applying said uni-directional voltage to said non-linear resistance so as to cause the resistance thereof to vary in accordance with the electrical variations of said second mentioned circuit, means for energizing said network from said supply circuit, and means connected to said network for deriving therefrom said variable phase potential.

3. In combination, an alternating current supply circuit, a circuit subject to electrical variations, and means for producing a potential variable in phase with respect to that of said supply circuit in accordance with said electrical variations, comprising means for deriving from said second mentioned circuit a uni-directional voltage variable in accordance with said electrical variations, and a phase-shift network including a resistance having a non-linear current-resistance characteristic and means substantially precluding the passage of direct current for energizing said non-linear resistance from said supply circuit, means substantially precluding the passage of alternating current for applying said uni-directional voltage to said non-linear resistance so as to cause the resistance thereof to vary in accordance with the electrical variations of said second mentioned circuit, and means connected to said network for deriving therefrom said variable phase potential.

4. In combination, an alternating current supply circuit, a circuit subject to electrical variations, and means for producing a potential variable in phase with respect to that of said supply circuit in accordance with said electrical variations, comprising means for deriving from said second mentioned circuit a uni-directional voltage variable in accordance with said electrical variations, and a phase-shift network including a homogenous conducting circuit element having a non-linear characteristic and means substantially precluding the passage of direct current for energizing said non-linear element from said supply circuit, means substantially precluding the passage of alternating current for applying said uni-directional voltage to said non-linear circuit element so as to cause the resistance thereof to vary in accordance with the electrical variations of said second mentioned circuit, and means connected to said network for deriving therefrom said variable phase potential.

5. In combination, an alternating current supply circuit, a circuit subject to electrical variations, and means for producing a potential variable in phase with respect to that of said supply circuit in accordance with said electrical variations, comprising means for deriving from said second mentioned circuit energy of a nature different to that of said supply circuit variable in accordance with said electrical variations, and a phase-shift network including a resistance having a non-linear current-resistance characteristic and means substantially precluding the passage of said different energy for energizing said non-linear resistance from said supply circuit, means substantially precluding the passage of energy of the kind furnished by said supply circuit for applying said different energy to said non-linear element so as to cause the resistance thereof to vary in accordance wtih the electrical variations of said second mentioned circuit, and means connected to said network for deriving therefrom said variable phase potential.

6. In combination, an alternating current supply circuit, a circuit subject to electrical variations, and means for producing a potential variable in phase with respect to that of said supply circuit in accordance with said electrical variations, comprising means for deriving from said second mentioned circuit energy variable in accordance with said electrical variations, and a phase-shift network including a homogenous thermal resistance element having a non-linear current-resistance characteristic and bi-laterally conducting means for connecting said non-linear resistance into said network, means for heating said non-linear resistance element in accordance with said variable energy so as to cause the resistance of said element to vary in accordance with the electrical variations of said second mentioned circuit, means for energizing said network from said supply circuit, and means connected to said network for deriving therefrom said variable phase potential.

7. In combination, an alternating current supply circuit, a circuit subject to electrical variations, and means for producing a potential variable in phase with respect to that of said supply circuit in accordance with said electrical variations, comprising means for deriving from said second mentioned circuit energy variable in accordance with said electrical variations, and a phase-shift network including a homogenous resistance element having a non-linear current-resistance characteristic and bi-laterally conducting means for connecting said non-linear resistance into said network, means for conducting said variable energy into said non-linear resistance element so as to cause the resistance of said element to vary in accordance with the electrical variations of said second mentioned circuit, means for energizing said network from said supply circuit and means connected to said network for deriving therefrom said variable phase potential.

8. In combination, an alternating current supply circuit, a circuit subject to electrical variations, and means for producing a potential variable in phase with respect to that of said supply circuit in accordance with said electrical variations, comprising means for deriving from said second mentioned circuit energy variable in accordance with said electrical variations, and a phase-shift network including a homogenous resistance element having a non-linear current-resistance characteristic and bi-laterally conducting means substantially precluding the passage of said variable energy into said network for connecting said non-linear resistance into said network, means substantially precluding the passage of energy from said network to said second mentioned circuit for conducting said variable energy into said non-linear resistance element so as to cause the resistance of said element to vary in accordance with the electrical variations of said second mentioned circuit, means for energizing said network from said supply circuit, and means connected to said network for deriving therefrom said variable phase potential.

9. In combination, an alternating current supply circuit, a circuit subject to electrical variations, and means for producing a potential variable in phase with respect to that of said supply circuit in accordance with said electrical variations, comprising means for deriving from said second mentioned circuit a uni-directional voltage variable in accordance with said electrical variations, and a phase-shift network including a plurality of capacitors and a resistance which increases its resistance with increase of energization, means for applying said uni-directional voltage to said non-linear resistance so as to cause the resistance thereof to vary in accordance with the electrical variations of said second mentioned circuit, means for energizing said network from said supply circuit and means connected to said network for deriving therefrom said variable phase potential.

10. In combination, an alternating current supply circuit, a circuit subject to electrical variations, and means for producing a potential variable in phase with respect to that of said supply circuit in accordance with said electrical variations, comprising means for deriving from said second mentioned circuit a uni-directional voltage variable in accordance with said electrical variations, and a phase-shift network including a plurality of capacitors and a resistance which decreases its resistance with increase of energization, means for applying said uni-directional voltage to said non-linear resistance so as to cause the resistance thereof to vary in accordance with the electrical variations of said second mentioned circuit, means for energizing said network from said supply circuit and means connected to said network for deriving therefrom said variable phase potential.

11. In combination, an alternating current supply circuit, a circuit subject to electrical variations, and means for producing a plurality of potentials simultaneously and oppositely variable in phase with respect to that of said supply circuit in accordance with said electrical variations, comprising means for deriving from said second mentioned circuit uni-directional voltage variable in accordance with said electrical variations, a first phase-shift network including a resistance which increases its resistance with increase of energization, a second phase-shift network including a resistance which decreases its resistance with increase of energization, means for applying said uni-directional voltage to said non-linear resistances so as to cause the resistance thereof to vary oppositely in accordance with the electrical variations of said second mentioned circuit, means for energizing said networks from said supply circuit, and means connected to said networks for deriving therefrom said variable phase potentials.

ALAN S. FITZ GERALD.